United States Patent [19]

Kadija et al.

[11] Patent Number: 4,468,312

[45] Date of Patent: Aug. 28, 1984

[54] RETICULATE ELECTRODE FOR ELECTROLYTIC CELLS

[75] Inventors: Igor V. Kadija; David D. Justice, both of Cleveland, Tenn.

[73] Assignee: Olin Corporation, New Haven, Conn.

[21] Appl. No.: 490,812

[22] Filed: May 2, 1983

Related U.S. Application Data

[62] Division of Ser. No. 238,267, Feb. 25, 1981, Pat. No. 4,401,519.

[51] Int. Cl.³ ............................................. C25B 11/03
[52] U.S. Cl. ................................. 204/284; 204/290 R
[58] Field of Search ............................ 204/290 R, 284

[56] References Cited

U.S. PATENT DOCUMENTS

| | | | |
|---|---|---|---|
| 4,032,427 | 6/1977 | Kadija | 204/283 |
| 4,086,155 | 4/1978 | Jonville | 204/284 |
| 4,120,772 | 10/1978 | Kadija | 204/284 |
| 4,370,214 | 1/1983 | Kadija | 204/290 R |

OTHER PUBLICATIONS

A. Tentorio and U. Casolo-Ginelli, Characterization of Reticulate, Three-Dimensional Electrodes, Journal of Applied Electrochemistry, pp. 195-205, (1978).
Optimization of the Effectiveness of a Three-Dimensional Electrode with Respect to its Ohmic Variables, Electrochimica Acta. 24, pp. 1145, 1149, (1979).

Primary Examiner—John F. Niebling
Attorney, Agent, or Firm—James B. Haglind; Donald F. Clements

[57] ABSTRACT

An improved reticulate electrode is produced by coating only one surface with a hydrophobic coating agent. Suitable hydrophobic coating agents includes thermoplastic polymers such as polyolefins, polyhalo-olefins, polyarylene sulfides and sulfone polymers. A preferred embodiment of the reticulate electrode is produced in a method which comprises:
(a) affixing filaments to a support fabric to form a network of filaments, the filaments being comprised of a metal or metal sensitized plastic,
(b) depositing an electroconductive metal on the filaments to form metal coated filaments, the deposition providing interfilament bonding at contact sites between adjacent filaments,
(c) removing the support fabric from the metal coated filament network to produce a reticulate electrode having a porosity of at least 80 percent, and
(d) depositing on only one surface of the reticulate electrode a coating of a hydrophobic coating agent.

The novel reticulate electrodes have improved gas nucleation and release properties which result in reduced cell voltage when employed in electrolytic processes.

9 Claims, 3 Drawing Figures

RETICULATE ELECTRODE FOR ELECTROLYTIC CELLS

This is a division, of application Ser. No. 238,267, filed Feb. 25, 1981, now U.S. Pat. No. 4,401,519.

This invention relates to electrodes for use in electrolytic cells. More particularly, this invention relates to electrodes for electrolytic cells having high surface areas.

In electrolytic cells employed in the electrolysis of aqueous solutions of ionizable compounds such as alkali metal chloride, foraminous metal electrodes are used which are constructed of perforated plates meshes or screens, and expanded metals. These electrodes employ significant amounts of metal and have a high ratio of metal weight to surface area and significant polarization values. As the cost of electric power has increased, various ways have been sought to increase the surface area of these electrodes and to reduce their polarization values and thus lower the power consumption for their operation.

One method of reducing polarization values of these prior art electrodes is to employ expensive catalysts to reduce the electrode charge transfer activation barrier. Using these materials, any savings resulting from a reduction of power consumption has been offset by the increase in costs for the electrodes. In addition, these catalysts have a relatively short operational life.

A more recent attempt to increase the surface area of electrodes has been the development of the three dimensional electrodes such as reticulate electrodes. A. Tentorio and U. Casolo-Ginelli have described one type of reticulate electrode (J. Applied Electrochemistry 8, 195–205, 1978) in which an expanded, reticulated polyurethane foam was metallized by means of the electroless less plating of copper. A thin layer of copper (about 0.3μm) was formed which conferred electrical conductivity to the matrix. Galvanic plating was employed to deposit additional amounts of copper. The reticulate electrode was employed in a cell for the electrolysis of a copper sulfate solution. This reticulate electrode, however, requires two separate electroplating operations which increases both the time required and the cost of fabrication. In addition, the geometrical configuration of the foam makes it difficult to obtain uniform coating of the substrate.

An improved reticulate electrode is that disclosed in U.S. Pat. No. 4,370,214. This reticulate electrode is produced by affixing filaments to a support fabric to form a network of filaments on the support fabric. An electroconductive metal is deposited on the filaments to form metal coated filaments. During the deposition of the electroconductive metal, interfilament bonding takes place at contact sites between adjacent filaments. Following deposition of the electroconductive metal, the support fabric is removed and a reticulate electrode having a porosity of at least about 80 percent is produced. The entire disclosure of U.S. Pat. No. 4,370,214 is incorporated by reference herein.

During electrolysis, the flow of electrolyte through three dimensional reticulate electrodes of the type described above is non-linear and follows a tortuous pass through the electrode. Gas bubbles are formed within the reticulate electrode structure which tend to impede the flow of electrolyte. This impedance results in undesirable increases in the cell voltage.

Therefore it is an object of the present invention to provide an improved reticulate electrode having reduced cell voltages.

Another object of the present invention is to provide a reticulate electrode having improved release properties for gas bubbles produced during electrolysis.

An additional object of the invention is to provide a reticulate electrode having improved patterns of electrolyte flow through the electrode structure.

These and other objects of the invention are accomplished in a method of producing a reticulate electrode for use in the electrolysis of aqueous solutions of ionizable compounds which comprises:

(a) affixing filaments to a support fabric to form a network of filaments, the filaments being comprised of a metal or metal sensitized plastic, (b) depositing an electroconductive metal on the filaments to form metal coated filaments, the deposition providing interfilament bonding at contact sites between adjacent filaments, (c) removing the support fabric from the metal coated filament network to produce a reticulate electrode having a porosity of at least 80 percent, and (d) depositing on only one surface of the reticulate electrode a coating of a hydrophobic coating agent.

Figure 1:
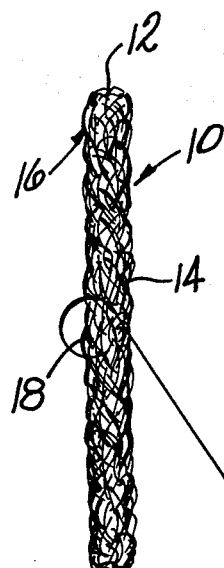
FIG. 1 represents a reticulate electrode of the present invention.
Figure 2:
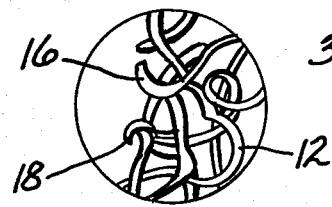
FIG. 2 is an enlarged view of the circled portion of FIG. 1.

FIG. 1 illustrates reticulate electrode 10 comprised of electroconductive metal filaments 12. Reticulate electrode 10 has a first surface 14 and a second surface 16. Second surface 16 is comprised of metal filaments 12, having coated portions 18 (best illustrated in FIG. 2) covered by a hydrophobic coating agent.

Figure 3:
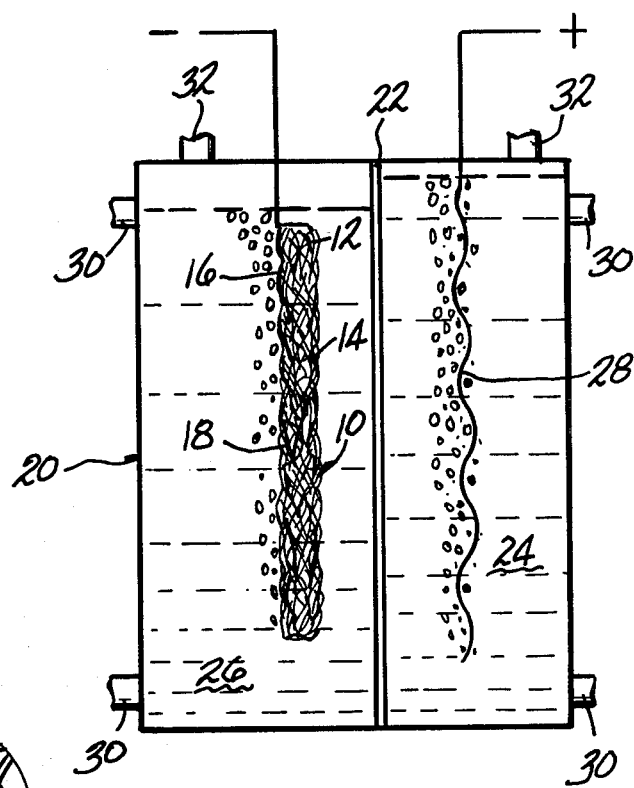
FIG. 3 illustrates a schematic view of an electrolytic cell in which a reticulate electrode of the present invention serves as the cathode.

Electrolytic cell 20, illustrated in FIG. 3, contains separator 22 which separates anode compartment 24 from cathode compartment 26. Cathode compartment 26 contains reticulate electrode 10 as the cathode having first surface 14 adjacent to separator 22 and second surface 16 having coated portion 18. Second surface 16 is positioned away from separator 22. Anode compartment 24 contains anode 28. Electrolytic cell 10 has conduits 30 for adding and removing liquid and outlets 32 for gaseous products. Current is fed to electrolytic cell 20 from an outside source.

More in detail, reticulate electrodes are electrodes which are light in weight, having, for example, from about 2 to about 80 percent, and preferably from about 10 to about 20 percent of the weight for conventional mesh electrodes of the same metal constituents. Reticulate electrodes have a large actual surface area where the extensive internal surface area is much more accessible to the electrolyte and hence the current than are conventional electrodes. Hence, the polarization values of reticulate electrodes are lower. The polarization values of reticulate electrodes can be lowered even further, however, by coating only one surface of the electrode with a hydrophobic coating agent. A hydrophobic coating agent is any composition which can be applied as a coating, has limited wettability when in contact with an aqueous solution of the electrolyte or electrolytes in the electrolytic cell, and which is substantially resistant to chemical attack by at least one of these electrolytes at cell operating conditions. These electrolytes include, for example, aqueous solutions of alkali metal chlorides and/or alkali metal hydroxides at concentrations normally used in electrolytic processes. Examples of suitable hydrophobic coating agents include thermoplastic polymers such as polyolefins, polyhaloolefins, polyarylene sulfides or sulfone polymers.

Polyolefin coating agents include, for example, polymers of olefins having from 2 to about 6 carbon atoms and include polyethylene, polypropylene, polybutylene and polymethylpentylene.

Polyhaloolefins include polymers of lower olefins such as ethylene and propylene which are substituted by at least one fluorine or chlorine atom. The olefin may be substituted by other elements such as hydrogen. Examples of polyhaloolefins which can suitably be used include polytetrafluoroethylene (PTFE), polyvinyl fluoride (PVF), polyvinylidene fluoride (PVDF), polychlorotrifluoroethylene (PCTFE), polyvinyl chloride (PVC), polyvinylidene chloride (PVDC), chlorinated polyvinylchloride (C-PVC), fluorinated ethylene-propylene copolymer (FEP), ethylene-chlorotrifluoroethylene copolymer (E-CTFE), ethylene-tetrafluoroethylene copolymer (ETFE), perfluoroalkoxy resin (PFA) and TEFLON® EPE. Preferred embodiments of polyhaloolefins are polyfluoroolefins selected from the group consisting of polytetrafluoroethylene, fluorinated ethylene-propylene copolymer, ethylene-chlorotrifluoroethylene copolymer, polyvinylidene fluoride and ethylene-tetrafluoroethylene copolymer.

Polyarylene sulfides which are suitable coatings include polyphenylene sulfide or polynaphthalene sulfide with polyphenylene sulfide being preferred.

Sulfone polymers include those such as polyether sulfones.

The hydrophobic coating agent may be applied to one surface of the reticulate electrode in any suitable manner including, for example, spraying, brushing, or dipping. The entire surface (projected surface) of the reticulate electrode can be coated with the hydrophobic coating agent. It is preferred that the hydrophobic coating agent be distributed uniformly over the surface in a non-continuous manner. Highly satisfactory gas release conditions are obtained when a portion, for example, from about 20 to about 40 percent of the projected surface area of the electrode is covered by the hydrophobic coating agent.

Application of the coating is carried out in such a manner that the penetration of the coating into the internal surface area of the reticulate electrode is minimized. For example, while it is recognized that the depth of penetration is related to the roughness of the outer surface of the electrode and that some penetration will occur, the depth of penetration should be no greater than about 30 percent of the thickness of the reticulate electrode, and preferably no more than about 10 percent of the thickness. Suitable amounts of hydrophobic coating agent which are applied to the surface of the electrode include those in the range from about 1 to about 100, and preferably from about 1 to about 10 milligrams per square centimeter of the electrode surface.

In a preferred embodiment, the hydrophobic coating agent is applied at an elevated temperature, for example, at a temperature near the melting temperature of the hydrophobic coating agent.

As shown in FIG. 3, the surface of the reticulate electrode which is coated with the hydrophobic coating agent by the method of the present invention is that which, when placed in an electrolytic cell having a separator between the anode compartment and the cathode compartment, is away from the separator rather than facing the separator, i.e., the back side of the electrode. In an electrolysis process where a gas is generated, gas bubble formation (nucleation) normally takes place at the face of the electrode in the gap between the separator and the electrode. To a lesser degree, gas bubble formation also takes place at the back of the electrode. Because the highly porous structure of a reticulate electrode permits ready access the electrolyte to the electroconductive filaments, considerable gas bubble nucleation also takes place within the internal structure of the electrode. The presence of a high density of gas bubbles at the face and within the internal structure of the reticulate electrode impedes the flow of electrolyte, increases the electrical resistance and results in a higher than desired cell voltage.

Employing the coated reticulate electrode of the present invention, the coated surface facilitates the nucleation of gas bubbles at the back of the electrode. The density of bubbles at the face and within the electrode is substantially reduced. Rapid release of gas bubbles formed at the back of the electrode enhances the gas lift effect which in turn increases the flow of electrolyte through the internal area of the reticulate electrode and removes more quickly gas bubbles formed at the face and within the electrode. A reduction in electrical resistance occurs and as a result, the cell voltage is lowered. While the mechanism of gas bubble nucleation and release on the coated metal filaments is not completely understood, it is believed that gas bubble nucleation is enhanced at sites where the coated portions of the filaments and the uncoated portions interface.

Use of the coated reticulate electrode of the present invention is particularly effective where the face of a reticulate electrode is pressed against the separator to minimize or eliminate the gap between the electrode and the separator. By concentrating gas bubble nucleation at the back of the electrode, electrical resistance created by gas bubble formation within the electrode is considerably reduced.

Using the method of the present invention, novel coated electrodes are produced which may serve either as anodes or cathodes. Where the coated reticulate electrode serves as the anode, the electroconductive metal includes platinum group metals, platinum group metal alloys, and their oxides. The term "platinum group metal" as used in the specification means an element selected from the group consisting of platinum, ruthenium, rhodium, palladium, osmium, and iridium.

Coated cathodes suitable for use in an electrolytic cell include those comprised of electroconductive metals such as nickel and nickel alloys; molybdenum and molybdenum alloys; iron and iron alloys; cobalt and cobalt alloys; magnesium and magnesium alloys; tungsten and tungsten alloys; and gold and gold alloys where the alloying metal is suitable for use in contact with the electrolyte employed in the cell.

The coated electrodes of the present invention are employed in electrolytic cells in which a gaseous product is generated. Suitable cells are those used in the production of chlorine or bromine and hydrogen by the electrolysis of alkali metal halide solutions, hydrogen and oxygen by the electrolysis of alkaline aqueous solutions or cells used in the production of alkali metal chlorates.

Separators which can be employed in the electrolytic cells include porous diaphragms such as those of asbestos or modified asbestos as well as hydraulically impermeable ion exchange membranes such as the cation permeable membranes sold commercially by the E. I. DuPont de Nemours and Co. under the tradename NAFION ® or those available from the Asahi Glass Company under the tradename FLEMION ®.

In addition to reticulate electrodes, the method of the present invention may be applied to coat one surface of other foraminous metal electrode which are used in electrolytic cells (non-galvanic cells) in which electrical energy is applied to aqueous salt solutions to generate gaseous products. These electrodes may be fabricated from screens, meshes, expanded metals, louvered metals and the like. The hydrophobic coating agent is applied in the same manner and using similar amounts as disclosed above. When mounted in an electrolytic cell, the coated surface of the electrode faces away from the separator. For example, where a metal electrode is comprised of two sections of mesh which are spaced apart, each section of mesh has an exterior surface and an interior surface where the exterior surfaces face a separator or an electrode of opposite polarity and the interior surfaces face each other. The hydrophobic coating agent is applied to the interior surfaces, the nucleation of gas bubbles is directed to the interior of the electrode, and the release of the gas bubbles takes place in the space between the coated interior surfaces.

The following examples are presented to further illustrate the invention without any intention of being limited thereby. All parts and percentages are by weight unless otherwise specified.

EXAMPLE 1

A web of silver coated nylon fibers (2.5 milligrams per square centimeter; fiber diameter about 10 microns) was needled onto a section of a polyester cloth (250 grams per square meter; air permeability 50 cubic meters per minute per square meter). A current distributor was attached to the web and the web-polyester cloth composite was immersed in an electroplating bath containing 450 grams per liter of nickel sulfamate and 30 grams per liter of boric acid at a pH in the range of 3-5. Initially electric current was passed through the solution at a current density of about 0.2 KA/$m^2$ of electrode surface. After about 10 minutes, the current was increased to provide a current density of 0.5 KA/$m^2$. During the electroplating period of about 3 hours, an electroconductive nickel coating was deposited on the silver fibers. Where adjacent fibers touched, plated joints formed to bond the fibers together into a network. After removal from the plating bath, the nickel plated structure was rinsed in water. The current distributor and the polyester fabric were peeled off and an integrated nickel plated structure obtained having a porosity of 96 percent and weight of 580-620 grams per square meter in which the nickel coated fibers had a diameter, on the average, of about 40±5 microns. The electrode was laid on a metal surface heated at a temperature of approximately 300° C. and one surface sprayed with a suspension of polytetrafluoroethylene (TEFLON ®-30) using a paint air brush. Several coatings of the suspension were applied until the final weight of polytetrafluoroethylene on the coated electrode surface was approximately 15 milligrams per square centimeter.

To determine its polarization characteristics, the PTFE coated nickel reticulate electrode was employed as an electrode in a cell containing a standard calomel electrode and an aqueous solution of sodium hydroxide (35% by weight of NaOH) at 90° C. An electric current of 2.0 KA/$m^2$ was passed through the cell and the polarization value determined. Extensive gas bubble formation took place along the coated side of the electrode during the operation. The results are recorded in Table 1 below.

COMPARATIVE EXAMPLE A

A reticulate nickel electrode was prepared by the identical procedure of EXAMPLE 1 with the exception that one surface of the electrode was not coated with a suspension of polytetrafluoroethylene. The polarization characteristics were determined by installing the nickel reticulate electrode without a coating of the thermoplastic polymer in the cell of EXAMPLE 1. The polarization value obtained is recorded in Table 1 below.

TABLE 1

| Reticulate Electrode Of | Polarization Values |
|---|---|
| EXAMPLE 1 (PTFE coated surface) | −1.400 v ± 10 mv |
| COMPARATIVE EXAMPLE A (uncoated surface) | −1.470 v ± 10 mv |

As shown in the above Table, the novel coated nickel electrode of EXAMPLE 1 has a polarization value of 70 millivolts below that of the uncoated nickel reticulate electrode. This substantial drop in the polarization value is attributed solely to the presence of the PTFE coating on one surface of the electrode. Gas bubble generation primarily takes place at the face of the uncoated reticulate electrode of Comparative Example A. However, using the coated electrode of EXAMPLE 1, gas bubble generation primarily takes place at the back of the electrode and away from the anode-cathode gap.

What is claimed is:

1. A reticulate electrode for use in the electrolysis of aqueous salt solutions in which a gaseous product is produced which comprises a network of electroconductive metal coated filaments having a porosity of above about 80 percent, said reticulate electrode having a face and a back side, said back side having a non-continuous coating of a hydrophobic coating agent.

2. The reticulate electrode of claim 1 in which said electroconductive metal is selected from the group consisting of nickel and nickel alloys; molybdenum and molybdenum alloys; iron and iron alloys; cobalt and cobalt alloys; magnesium and magesium alloys; tungsten and tungsten alloys; and gold and gold alloys where the alloying metal is suitable for use in contact with the electrolyte.

3. The reticulate electrode of claim 2 in which said electrode is a cathode.

4. The reticulate electrode of claim 3 in which said electroconductive metal is selected from the group consisting of nickel and nickel alloys.

5. The reticulate electrode of claim 1 in which said hydrophobic coating agent is a thermoplastic polymer selected from the group consisting of polyolefins, polyhaloolefins, polyarylene sulfides, and sulfone polymers.

6. The reticulate electrode of claim 5 in which said thermoplastic polymer is a polyhaloolefin selected from the group consisting of polytetrafluoroethylene, polyvinyl fluoride, polyvinylidene fluoride, polychlorotrifluoroethylene, fluorinated ethylenepropylene copolymer, ethylene-chlorotrifluoroethylene copolymer, polyvinyl chloride, polyvinylidene chloride, perfluoroalkoxy resin, ethylene-tetrafluoroethylene copolymer and TEFLON ® EPE.

7. The reticulate electrode of claim 5 in which said thermoplastic polymer is a polyarylene sulfide selected from the group consisting of polyphenylene sulfide and polynaphthalene sulfide.

8. The reticulate electrode of claim 6 in which said polyhaloolefin is selected from the group consisting of polytetrafluoroethylene, fluorinated ethylene-propylene copolymer and ethylene-chlorotrifluoroethylene copolymer.

9. The reticulate electrode of claim 7 or claim 14 in which from about 20 to about 40 percent of the projected surface area of said coated surface is covered by said hydrophobic coating agent.

* * * * *

UNITED STATES PATENT AND TRADEMARK OFFICE
CERTIFICATE OF CORRECTION

PATENT NO. : 4,468,312

DATED : August 28, 1984

INVENTOR(S) : Igor V. Kadija and David D. Justice

It is certified that error appears in the above-identified patent and that said Letters Patent is hereby corrected as shown below:

In the Abstract, line 3, after "agents" delete "includes" and insert --include--.

In Column 1, line 16, after "amounts" delete "ofmetal" and insert --of metal--.

In Column 4, line 12, after "access" insert --of--.

In Column 8, Claim 9, line 1, after "claim" (second occurrence) delete "14" and insert --8--.

Signed and Sealed this

*Twelfth* Day of *March 1985*

[SEAL]

*Attest:*

DONALD J. QUIGG

*Attesting Officer*  *Acting Commissioner of Patents and Trademarks*